Nov. 2, 1954 B. V. VONDERSCHMITT 2,693,549
DEFLECTION CIRCUIT
Filed April 30, 1953

INVENTOR.
Bernard V. Vonderschmitt
BY
ATTORNEY

United States Patent Office 2,693,549

Patented Nov. 2, 1954

2,693,549

DEFLECTION CIRCUIT

Bernard V. Vonderschmitt, Merchantville, N. J., assignor to Radio Corporation of America, a corporation of Delaware Application April 30, 1953, Serial No. 352,247

11 Claims. (Cl. 315—27)

Figures 1, 2:
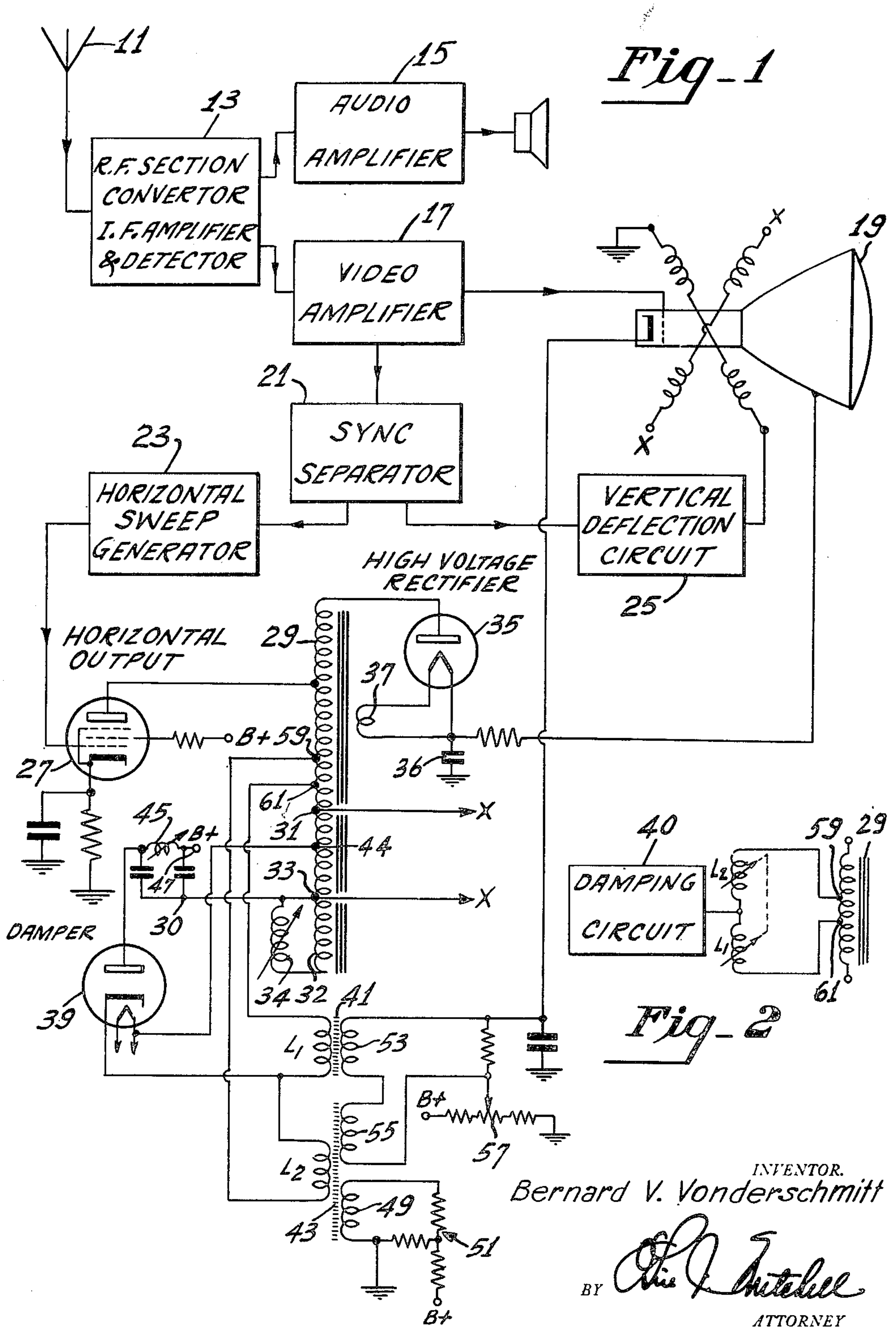

This invention relates to television deflection circuits, and more particularly, to circuits for obtaining linear sweep of an electron beam in a cathode ray tube.

In present television practice, the picture is formed in a cathode ray tube, or kinescope, by an electron beam which is modulated in accordance with an incoming video signal and which is deflected to trace successive lines forming a raster on a fluorescent screen. Bright and dark portions on the picture result from strong and weak variations in the beam intensity as the raster is scanned.

Energy is imparted to the electron beam from the low voltage power supply of the television receiver and also from a high voltage source which utilizes transient pulses occurring in the deflection circuit during the retrace intervals. The energy requirement of the electron beam varies considerably as the intensity of the beam varies, and since the beam intensity is controlled by the incoming video signal, the energy requirement of the beam is subject to continual variation in accordance with the modulation of the signal. The power available from the low voltage power supply is great as compared to the power requirements of the electron beam, and therefore the low voltage supply remains unaffected by the beam variations. On the other hand the high voltage power supply, which functions as a part of the deflection circuit, is limited in the lower output, both delivered and available. Variations of the electron beam, therefore, materially affecting the loading of the high voltage supply and the deflection circuit is likewise affected resulting in non-linearity of the rate of deflection.

It has been found that variations of the beam intensity may cause as much as 3 watts variation in the loading of the deflection circuit. Since present deflection circuits consume about 22 watts of power it is to be noted that the variations in the load amount to about 12% of the total load on the circuit. It has been proposed that cathode ray kinescopes be made with narrower necks which could be provided with deflection coils fitting in closer proximity to the electron beam. This would be advantageous because less energy would be required for deflection of the beam, and the deflection circuit could operate on about 12 watts of power. Under these conditions, however, a 3 watt variation in the loading of such a circuit would therefore result in a considerably greater percentage variation. This would result in poorer regulation of the high voltage power supply and a greater degree of non-linearity in deflection of the electron beam. Thus the need for correcting the linearity and the high voltage regulation in the deflection circuit will be even greater if narrow necked kinescopes become generally used in television.

It is an object of this invention, therefore, to provide a television deflection system with means for correcting the non-linearity which results from variations of the intensity of the electron beam in the cathode ray tube.

A further object is to provide a high voltage power supply which has better regulation and is not as adversely affected by variations in the intensity of the electron beam.

According to this invention a horizontal deflection circuit employs switching means, preferably in the form of saturable reactors which are responsive to changes in the cathode current of the kinescope for adjustably connecting the damping means to a plurality of taps on the output transformer. These saturable reactors provide a connection between the horizontal output transformer and the damper tube. As the cathode current of the kinescope varies, the effective connection between the damper tube and the output transformer likewise varies as a compensating measure thereby improving the linearity of deflection of the electron beam and the regulation of the high voltage power supply.

Other objects of this invention will become apparent upon a reading of the following specification and an inspection of the accompanying drawing in which:

Figure 1 is a circuit diagram, partially schematic, of a cathode ray tube television receiving system including a deflection circuit involving the present invention; and Figure 2 is a simplified schematic diagram illustrating the switching function of the saturable reactors which connect the damper tube to taps on the output transformer.

Referring again, but in more detail, to Figure 1, there is shown a circuit arrangement of a television receiver which includes an antenna 11 and a television R. F. section, converter section, I. F. amplifier and detector 13 which feeds both the sound channel 15 and the video amplifier 17. The video signal is then impressed on the control grid of the cathode ray tube 19. The synchronizing signal separator 21 receives its signal from the video amplifier 17 and provides the synchronizing pulses for both the horizontal sweep generator 23 and the vertical deflection circuit 25. From the output tube 27 of the horizontal sweep generator, deflection power in the form of sawtooth waves is supplied to the horizontal output transformer 29. The deflection winding of the horizontal deflection yoke is connected to the horizontal output transformer at taps 31 and 33. A variable inductance 34 is connected across a portion of the output transformer to serve as a width control.

The high voltage source for the cathode ray tube comprises a high voltage rectifier 35 which receives transient pulses during the retrace intervals from the horizontal output transformer 29. These pulses serve to charge a condenser 36 from which the kinescope receives its second anode voltage.

Oscillations which would result from the transient pulses in the output transformer are damped out by the damper tube 39 which is connected to the output transformer by saturable reactors 41 and 43. The heater element of the damper tube is connected to a tap 44 on the output transformer so that the heater will be held at a safe potential with respect to the cathode. The plate of the damper tube is connected through a linearity control 45 to the B+ terminal 47.

The saturable reactors 41 and 43 are of the type disclosed by the U. S. patents of Knoop 1,953,487 and Whitley 2,229,952. The saturation windings 53 and 55 of the reactors 41 and 43 are connected in series and are connected to a direct current source 57 which supplies current to the cathode of the kinescope 19. The first saturable reactor 41 is normally unsaturated, and when current flows in its saturation winding 53 it then becomes saturated. The second saturable reactor 43 is provided with an additional saturation winding 49 which is connected to a direct current source through a bleeder network 51 and arranged to oppose the effect of current flow in the other saturation winding 55. This reactor 43 is normally in a state of saturation, and becomes less saturated when current flows in its winding 55, since the two saturation windings 49 and 55 are arranged to oppose each other, and the magnetizing effect of one winding will cancel the magnetizing effect of the other winding.

When current flow increases in the saturation windings 53 and 55, the first reactor 41 becomes more saturated while the second reactor 43 becomes less saturated. This results in the impedance winding $L_1$ decreasing in inductance while the second impedance winding $L_2$ increases in inductance. Windings $L_1$ and $L_2$ are themselves connected in series and are connected to separate taps 59 and 61 on the horizontal output transformer 29. The cathode of the damper tube 39 is connected to the series connection point of the impedance windings $L_1$ and $L_2$ and is thereby connected to the output transformer 29 through taps 59 and 61. When there is no cathode current flowing in the kinescope, no current flows in the saturation windings 53 and 55 and the first reactor 41 is unsaturated while the second reactor 43 is saturated. Under these conditions, winding $L_1$ has considerable reactance while winding $L_2$ has but slight reactance, and the cathode of the damper tube is effectively connected to tap 59 of the output transformer. When the cathode current of the kinescope is increased to a high value, reactor 41 becomes saturated and reactor 43 becomes unsaturated. Under these conditions the reactance of winding $L_1$ becomes slight while the reactance of winding $L_2$ becomes great, and the damper tube is effectively connected to tap 61 of the output transformer.

The saturable reactors 41 and 43 essentially provide a switching means between the damper tube cathode and the taps 59 and 61 of the output transformer. When the cathode current of the kinescope varies in intensity, the effective connection between the damper tube and the output transformer likewise varies in its relative position. The non-linearity which results from the varying intensity of the electron beam is thereby compensated for by effectively shifting the connection between the damper tube and the output transformer.

Figure 2 illustrates the function of the saturable reactors as they are used in this invention. The saturable reactors $L_1$ and $L_2$ are shown, schematically, as a pair of variable inductances which are ganged to operate together. When the first inductance $L_1$ is at a relatively high value and the second inductance $L_2$ is at a relatively low value, then the damping circuit 40 is effectively connected to tap 59 of the transformer 29. This is the condition of low cathode current to the kinescope. If the first inductance $L_1$ decreases in value, the second inductance $L_2$ increases in value, and the effective connection of the damping circuit shifts from tap 59 towards tap 61 on the transformer. This is the condition of increasing cathode current to the kinescope.

In a preferred embodiment of this invention the inductance of the impedance windings $L_1$ and $L_2$ of the saturable reactors should have a maximum value of approximately five times the inductance of that part of the output transformer which is between the taps 59 and 61. If the inductance of the saturable reactors is too small, then the reactors serve to short that portion of the transformer. It has been determined that the maximum inductance of windings $L_1$ and $L_2$ should be in the range of 80 to 100 millihenries for use in present television circuits.

In another form of this invention, the cathode of the damper tube 39 may be connected directly to the output transformer 29, and saturable reactors may be inserted as a connection between the plate of the damper tube and the low voltage portion of the transformer. The saturable reactors will thereby switch the effective connection of a lead 30 in the plate circuit between tap 33 and the low voltage end 32 of the output transformer. The switching in the plate circuit of the damper tube will accomplish the same function as the previously described switching of the damper cathode, and it has an advantage in that the capacity between the saturable reactors and ground will be less critical to the circuit.

While the foregoing description and drawing illustrates the use of this invention in a deflection circuit which uses an auto-transformer, it will be appreciated that this invention would function equally as well if the horizontal output transformer were of the type having multiple windings. It is not intended, therefore to limit this invention to use with any particular type of output transformer.

What is claimed is:

1. In a television system, a circuit for deflecting an electron beam comprising an output transformer having a plurality of taps, a damping means, and a switching means adjustably connecting the damping means to the plurality of taps on said output transformer, said switching means being responsive to intensity variations in the electron beam.

2. In a system for deflecting an electron beam in a cathode ray tube of a television receiver, the combination of means for generating deflection waves, a deflection winding, a transformer coupled between said deflection wave generating means, and said deflection winding, means for damping transient waves appearing across said transformer, and a variable switching means responsive to variations in said electron beam, said variable switching means being connected between said damping means and said transformer.

3. In a television receiver having an electron beam deflection system including a high voltage power supply connected to a transformer, the combination of a circuit for damping transient oscillations appearing across the transformer and a variable switching circuit connected between the transformer and said damping circuit, said variable switching circuit being responsive to intensity variations in the electron beam whereby the electron beam deflection and the high voltage power supply is compensated for intensity variations in the electron beam.

4. In a television receiver, a circuit for deflecting an electron beam comprising means for generating deflection waves, a deflection winding, an output transformer connected between said deflection winding and said deflection wave generating means, a unilateral conducting device having at least two electrodes, the first of said electrodes being connected to said output transformer, and the second of said electrodes being connected to a variable switching means responsive to intensity variations in said electron beam, said switching means being connected to a plurality of taps on said output transformer whereby the effective connection between the second electrode of said unilateral conducting device and said output transformer is controlled by the intensity of the electron beam.

5. The electron beam deflection circuit of claim 4 wherein the variable switching means comprises a plurality of saturable reactors, said saturable reactors each having an impedance winding and at least one saturation winding, said saturation windings being responsive to variations in the intensity of said electron beam, and said impedance windings being operative to vary the effective connection of the second electrode of said unilateral conducting device between the plurality of taps on said output transformer.

6. In a television receiver having a cathode ray tube, a circuit for deflecting an electron beam, comprising means for generating deflection waves, a deflection winding for the cathode ray tube, an output transformer coupled between said deflection wave generating means and said deflection winding, a first saturable reactor, and a second saturable reactor connected in series with said first saturable reactor, said saturable reactors being responsive to intensity variations in the electron beam, a damper tube for damping transient oscillations appearing across said output transformer, said damper tube being connected to both saturable reactors at the series connection of said saturable reactors, said first saturable reactor and said second saturable reactor being connected to separate points on the output transformer, whereby the damper tube is effectively coupled to the output transformer at various points dependent on the intensity of the electron beam.

7. In a television receiver having a kinescope with a cathode for supplying electrons to an electron beam and a high voltage anode for accelerating said electrons, a deflection circuit comprising a deflection wave generator connected to an output transformer having a plurality of taps, deflection coils for deflecting said electron beam, said deflection coils being connected to said output transformer, a high voltage rectifier connected between said output transformer and the high voltage anode of said kinescope, a first saturable reactor having a single saturation winding and an impedance winding, said impedance winding being connected between a first tap on said output transformer and a means for damping transient oscillations, a second saturable reactor having a first saturation winding and a second saturation winding and an impedance winding, said impedance winding being connected between a second tap on said output transformer, and said transient oscillation damping means, the single saturation winding of said first saturable reactor and the first saturation winding of said second saturable reactor being coupled to a circuit for supplying current to the cathode of said kinescope, the second saturation winding of said second saturable reactor being connected to a source of continuous current whereby relative impedance between the said transient oscillation damping means and the first and second taps of said output transformer depends upon the relative saturation of the first and second saturable reactors and is responsive to intensity of current flow in the cathode of said kinescope.

8. In a television receiver, a circuit for deflecting an electron beam in a cathode ray tube and for supplying a high voltage for accelerating the electron beam in said cathode ray tube, said circuit comprising means for generating deflection waves, a deflection winding, an output transformer coupled between said deflection wave generating means to said deflection winding, a high voltage rectifier connected to said output transformer, a means for damping transient oscillations appearing across said output transformer, and a pair of saturable reactors coupled between said damping means and said output transformer, said pair of saturable reactors being responsive to intensity variations in the electron beam of said cathode ray tube and being operative to vary the coupling between said damping means and said output transformer.

9. In a system for generating high voltage for accelerating an electron beam in a cathode ray tube by rectifying pulses appearing across an output transformer, a circuit for compensating for load variations on said high voltage generating system, said compensating circuit comprising a unilateral conducting device for damping transient oscillations appearing across said output transformer, and a variable switching means connected between said unilateral conducting device and said output transformer, said variable switching means being responsive to intensity variations of the electron beam in said cathode ray tube and being operative to vary the effective connection of said unilateral conducting device between a first tap and a second tap on said output transformer.

10. The load compensating circuit of claim 9 wherein the variable switching means comprises a plurality of saturable reactors each having a saturation winding and an impedance winding, said saturation windings being responsive to intensity variations of the electron beam of said cathode ray tube and said impedance windings being operative to vary the effective connection of said unilateral conducting device between the first tap and the second tap on said output transformer.

11. In a television receiver employing a system for generating high voltage for accelerating an electron beam in a cathode ray tube by rectifying pulses appearing across an output transformer, a circuit for compensating for load variations on said high voltage generating system, said compensating circuit comprising a unilateral conducting device having at least two electrodes, the first of said electrodes being connected to said output transformer, a first saturable reactor having an impedance winding and a saturation winding, and a second saturable reactor having an impedance winding and two saturation windings, the impedance winding of said first saturable reactor being connected between the second electrode of said unilateral conducting device and a first tap on said output transformer, the impedance winding of said second saturable reactor being connected between the second electrode of said unilateral conducting device and a second tap on said output transformer, the saturation winding of said first saturable reactor and the first saturation winding of said second saturable reactor being connected into a circuit for supplying current for the electron beam of said cathode ray tube, the second saturation winding of said second saturable reactor being connected to a source of continuous current, whereby the said saturable reactors are responsive to intensity variations of the electron beam of said cathode ray tube, and are operative to vary the effective connection of the second electrode of said unilateral conducting device between the first tap and the second tap on said output transformer.

References Cited in the file of this patent

UNITED STATES PATENTS

| Number | Name | Date |
|---|---|---|
| 2,521,158 | Gannaway et al. | Sept. 5, 1950 |
| 2,536,839 | Clark et al. | Jan. 2, 1951 |
| 2,536,857 | Schade | Jan. 2, 1951 |
| 2,543,719 | Clark | Feb. 27, 1951 |
| 2,646,532 | Hazeltine | July 21, 1953 |